United States Patent [19]

Ishimaru et al.

[11] 4,285,904

[45] Aug. 25, 1981

[54] METHOD AND APPARATUS FOR SEALING CENTRIFUGE TUBES

[75] Inventors: Kenzo Ishimaru, San Jose; Thomas D. Sharples, Atherton, both of Calif.

[73] Assignee: Beckman Instruments, Inc., Fullerton, Calif.

[21] Appl. No.: 912,696

[22] Filed: Jun. 5, 1978

[51] Int. Cl.³ .............................................. B29C 24/00
[52] U.S. Cl. .................................. 264/322; 425/384; 425/392
[58] Field of Search ........................ 264/23, 296, 322; 425/392, 393, 384; 249/80

[56] References Cited

U.S. PATENT DOCUMENTS

| | | | |
|---|---|---|---|
| 2,335,799 | 11/1943 | Schwab | 53/486 |
| 2,514,937 | 7/1950 | Collins | 425/393 |
| 3,300,559 | 1/1967 | Baehr | 264/322 X |
| 3,475,786 | 11/1969 | Pearson | 425/393 X |
| 3,509,252 | 4/1970 | Baehr | 264/322 X |
| 3,545,168 | 12/1970 | Day | 264/322 X |
| 3,711,230 | 1/1973 | Magerly | 425/393 |
| 3,929,943 | 12/1975 | Klimaszewski | 264/322 X |

FOREIGN PATENT DOCUMENTS 1782213 7/1971 Fed. Rep. of Germany .

*Primary Examiner*—Thomas P. Pavelko
*Attorney, Agent, or Firm*—R. J. Steinmeyer; F. L. Mehlhoff

[57] ABSTRACT

A method of closing or sealing a filler passage formed in a neck or stem protruding from the small access opening in the upper end of a substantially closed centrifuge tube. The neck is formed of a readily fusible material and a heat conductive cap member is positioned over the open end portion of the neck closely confining it therein. Heat and pressure are applied to the cap causing progressive portions of the neck to melt and fold into the filler passage where it forms a molten mass within the filler passage above the access opening to the tube. Heat and pressure are removed, permitting the cap to cool and the molten mass to solidify completely sealing or filler passage of the centrifuge tube. The cap is then removed and the centrifuge tube is fully prepared for centrifugation.

19 Claims, 13 Drawing Figures

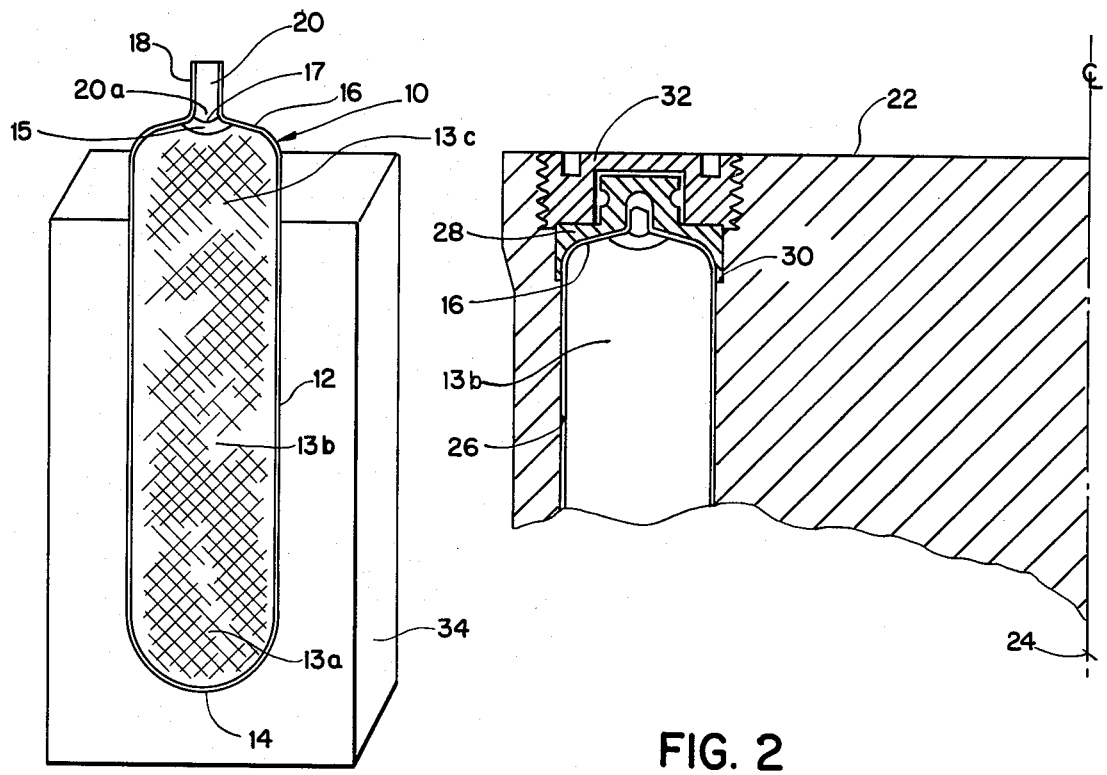
FIG. 1
FIG. 2
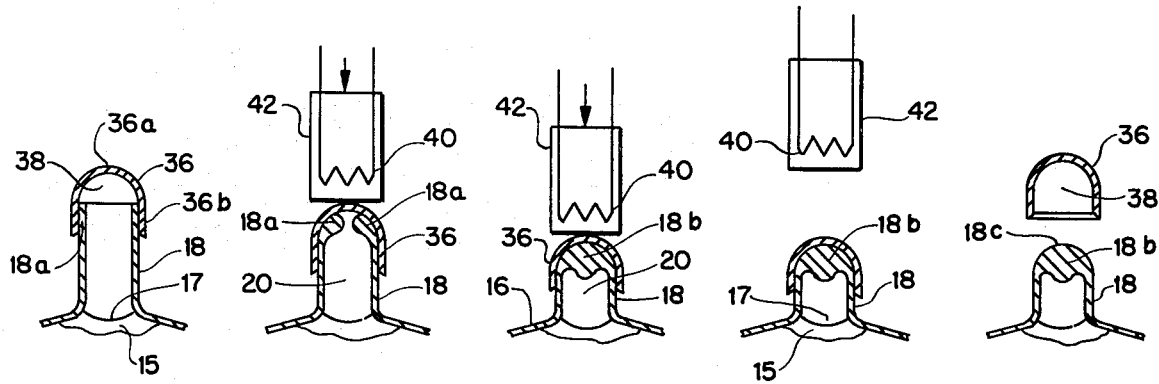
FIG. 3a   FIG. 3b   FIG. 3c   FIG. 3d   FIG. 3e
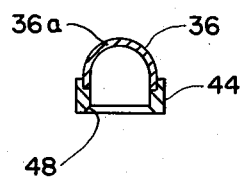
FIG. 4
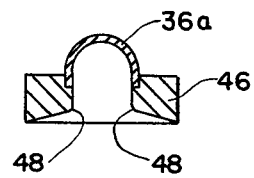
FIG. 5

METHOD AND APPARATUS FOR SEALING CENTRIFUGE TUBES

BACKGROUND OF THE INVENTION

The present invention is directed to the sealing or closing of centrifuge tubes and, more particularly, to the sealing of a centrifuge tube which is substantially closed at both ends and having only a small access opening at one end from which a neck or stem protrudes carrying a filler passage to the tube.

The typical centrifuge tube has a generally uniform cylindrical shape with one end closed and the other end being completely open to receive the fluid sample to be subjected to centrifugation. After introduction of the fluid sample into the tube, it is usually necessary to provide a very tight closure or capping means over the open end of the tube during centrifugation. The closure or capping mechanism must be extremely tight, especially when the tube is used in a centrifuge rotor of the type known as a fixed-angle rotor in which the tube cavities are oriented at an acute angle or approach an angle of 0° with respect to the spin axis of the rotor. The hydrostatic pressure within the tube becomes extremely great when the centrifuge is rotated at speeds of 20,000 r.p.m.'s or greater. Any leak, no matter how minute, eventually causes a liquid vacancy in the tube. Since centrifuge tubes are usually flexible and sometimes very pliable, any loss of liquid may cause the tube to collapse. This in turn may cause the tube opening to pull away from the capping mechanism further aggravating the problem.

In a recent development, Steven T. Nielsen developed a new type of centrifuge tube, which makes sealing of the tube and support thereof within a centrifuge much simpler and more reliable. A U.S. patent application Ser. No. 912,698 Pending Group 350 directed to such improved tube, assigned to Beckman Instruments, Inc., the assignee of the present invention, has been filed concurrently with the present application. The invention of the said Steven T. Nielsen was made prior to the present invention and nothing is herein claimed as our invention that is shown or described in the Nielsen application, which is to be regarded as prior art with respect to this application.

The Nielsen centrifuge tube is a substantially closed cylindrically shaped tube having a small access or filler opening in one end thereof. Protruding from the opening is a neck or stem enclosing a filler passage through which liquid is inserted into the tube. In a preferred form, the Nielsen centrifuge tube is in the general shape of a "hot dog" with a narrow stem protruding therefrom. The neck or stem, and preferably the whole tube, is formed of a fusible material, such as a polyallomer plastic or the like, which may be heat sealed to close the passage. When the passage is sealed, the centrifuge tube surrounds the liquid sample and there is no requirement for a tube capping mechanism across the opening of the tube in contact with the liquid sample.

After the tube is placed in a centrifuge, a support plug, conforming to the shape of the upper surface of the tube, may be placed over the tube to provide additional support for the upper end of the tube and seal to prevent the hydrostatic force of the liquid within the tube from blowing open or perforating the upper end of the tube.

One prerequisite to the proper use of the Nielsen type tube is that it must be properly sealed in order to make its use reliable. A simple pinch closure of the neck, heated to fusion temperature, will seal the passage so that it will withstand moderate pressure. However, this simple sealing method is unsatisfactory for reliable performance under the high hydrostatic pressure generated in an ultracentrifuge rotor, particularly in such rotors where the angle of the tube approaches 0° with respect to the spin axis of the rotor. In such rotors the internal pressures at the tube neck are in excess of 1,000 psi.

In making the seal, it is also necessary to avoid significant heating of the sample within the tube which may be just adjacent the opening in the upper end of the tube. Typically centrifuge samples are formed of biological material which could be damaged by heat. And finally, since it is desirable to support the upper surface of the tube during centrifugation with a plug conforming to this surface, it is necessary to conform or mold the neck of each tube so that the upper surface is always the same general shape.

SUMMARY OF THE INVENTION

The present invention comprises a highly reliable method for heat sealing the filler passage in the neck protruding from a substantially closed centrifuge tube and to apparatus for making the seal. In forming the seal or closure, the tube is supported in an upright position and a heat conductive cap member is placed over the end portion of the neck, the cap having an inner cavity closely confining the outer surface of the end portion of the neck. Heat and pressure are applied to the cap to melt progressive portions of the neck causing them to fold inwardly and form a molten mass within the cavity and across the filler passage. The heat and pressure are removed from the cap, which is cooled, permitting the molten mass in the filler passage to solidify and thereby seal the passage. The cap is then removed from the neck which is permanently formed in the shape of the cavity of the cap.

The cap is quite easily heated, either by contact or by radiation, to the fusion temperature of the plastic or other fusible material. By means of the cap, the heat applied to seal the neck is easily controlled and very little heat is transmitted to the upper end of the tube where the sample may be positioned.

The cap itself forms a mold for the molten portions of the neck so that, on removal, the outer surface of the seal is substantially the same in every instance. It is so formed as to mate with the internal surface contours of a mating plug designed to be supported above the centrifuge tube within the tube cavity.

The seal formed in this manner is extremely strong and may be reliably produced with a minimum requirement for skilled operation or dexterity. The importance of a reliable seal which will not leak becomes extremely important when it is understood that many biological samples to be centrifuged have been prepared at great cost in time and money. Many such samples may include radioactive isotopes or may be formed of pathogenic materials wherein any leakage that might escape from the tube and centrifuge could create a hazard to the operator or other laboratory personnel.

BRIEF DESCRIPTION OF THE DRAWINGS

FIG. 1 is a sectional view of a substantially closed centrifuge tube and a supporting base holding the tube upright;

FIG. 2 illustrates a substantially closed centrifuge tube with its neck sealed as it is used in a centrifuge rotor;

FIGS. 3a–e are successive schematic views illustrating the method and apparatus employed for sealing the neck of the tube;

FIG. 4 is a sectional view illustrating a second embodiment of the heat conductive cap member;

FIG. 5 is a sectional view illustrating another embodiment of the heat conductive cap member;

DETAILED DESCRIPTION OF THE INVENTION

Figure 6A:
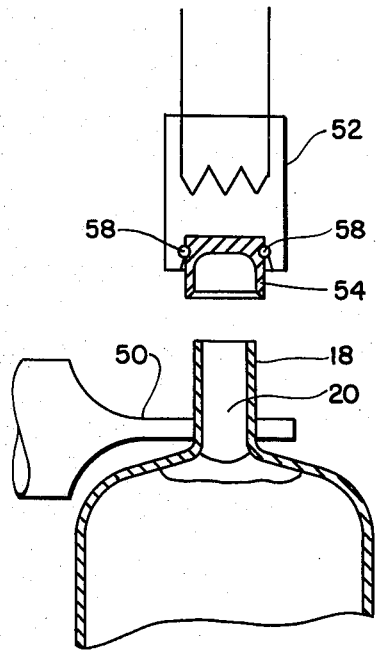
FIGS. 6a–c are successive schematic views illustrating another embodiment of the sealing method.

Referring now to the drawings, there is shown in FIG. 1 a substantially closed centrifuge tube 10 of the type developed and disclosed in the aforesaid Steven T. Nielsen patent application Ser. No. 912,698. The preferred embodiment of the tube has a cylindrical central portion 12, a generally semi-spherical bottom portion 14 and a substantially closed top 16 of generally semi-spherical shape. Protruding from the top 16 is a neck or stem 18 forming a filler passage 20 which connects to the access opening or fill port 20a of the tube. Preferably the top 16, bottom portion 14 and neck 18 are integrally formed with the cylindrical central portion 12. The tube 10 may be easily produced by an extrusion blow-molding process from a fusible plastic material such as polyallomer. Polyallomer is a random block copolymer of propylene and ethylene. It is a readily fusible plastic material sold by Eastman Chemical Co. under the tradename "Tenite ® Polyallomer". It is produced by a special polymerization process that produces copolymers of the 1-olefins exhibiting a degree of crystallinity normally associated only with homopolymers. The term "polyallomer" was coined to identify the polymers manufactured by this process and to distinguish them from polymer blends and previously known copolymers. While the easily fusible plastic "polyallomer" has been identified above, it is not intended to limit the invention in any way as other fusible plastic materials can be employed to produce excellent seals. Such a material must be capable of being heated to the fusion temperature for heat sealing the filler passage 20 as will be hereinafter described.

The tube of FIG. 1 is shown with typical contents consisting of a density gradient solution 13 gradually increasing from high density gradient solution 13a to medium density at 13b and to a lower density at 13c. The sample 15 to be treated is more or less floating on the gradient solution 13. A space 17, free of sample, in the neck 18 and slightly below the neck is provided to preclude significant sample heating during the sealing operation.

After the tube is sealed in accordance with the present invention, it and its contents are placed in a centrifuge rotor such as that shown in FIG. 2. The rotor 22 is designed to rotate at high speed around the spin axis 24 with the centrifuge tube displaced radially therefrom and supported in a tube cavity 26 having substantially the same shape as the outer surface of the tube. In the rotor of FIG. 2, the cavity is shown with a longitudinal axis at an acute angle of 0° with respect to the spin axis of the rotor. It is understood that the acute angle may be greater than 0° with the upper end or top 16 of the tube closer to the spin axis than the bottom portion 14.

In the rotor of FIG. 2, there is provided a conforming spacer plug 28 adapted to fit into the tube cavity. The plug 28 is supported by a shoulder formed in the rotor and is conformed to fit very closely the upper surface of the top portion 16 of the centrifuge tube. The plug 28 is retained in the cavity by a threaded retaining member 32. The hydrostatic pressures created by the tube liquid contents 13b during centrifugation exert tremendous force on the tube but the contents are securely retained within the sealed tube by virtue of its support from the rotor cavity and the retainer plug which closely conform to the shape of the centrifuge tube.

Now referring to FIGS. 1 and 3a–e, the method and apparatus for sealing the Nielsen type centrifuge tube is illustrated. A support 34 is provided for maintaining the tube in a generally upright position with the neck 18 protruding upwardly. FIG. 3a shows the neck 18 ready for sealing. A snug fitting, high heat conductive, low mass, cap 36 is placed or slipped over the end portion 18a of the fusible tube neck 18. The cap is provided with an inner cavity 38 which, in this embodiment, is formed by a semi-spherical central portion 36a and a cylindrical shaped sidewall 36b. The cavity 38 closely confines the end portion of the neck 18. As depicted in FIG. 3b heat is applied to the heat conductive cap 36 by means of a heating element 40 within a plunger or pressure applying means 42. The cap 36 is rapidly heated to the fusion temperature of the plastic neck 18 causing the end portion 18a to melt. A downward pressure is applied to the plunger 40 and, as the neck melts, the shape of the cavity 38 or inner sidewall of the cavity causes the neck walls to be formed inwardly at 18a. The neck walls conform to the inwardly slanting sidewalls of the cavity 38.

In FIG. 3c, the cap 36 has been moved downwardly toward the top 16 of the tube. The heat and pressure applied to the neck causes progressive portions of the neck sidewalls to melt and create a melted mass 18b of plastic material extending across the filler passage 20. When the cap is moved sufficiently to its final location relative to the top 16 of the tube, there remains a small air space 17 above the sample, which insulates the sample from the heat of the melted neck.

As shown in FIG. 3d, the heat and pressure is removed from the cap and it is permitted to cool. As the cap cools, it conducts heat away from the molten mass 18b, which then solidifies, completely sealing the filler passage 20. After the sealed neck has cooled sufficiently, the cap is removed by lifting it from the neck. Only a slight upward force is required to do this after the mass 18b has solidified. This is illustrated in FIG. 3e.

Note that the upper portion of the neck 18 takes on the configuration of the inner cavity surface 38. The cap cavity acts as a mold forming each seal with this same general configuration, which is similar to the inner surface of the support plug 28 (see FIG. 2). This can be done consistently from tube seal to tube seal.

FIGS. 4 and 5 illustrate two different embodiments of the cap member 36. In FIG. 4, the central portion 36a of the cap is formed of a high heat conductivity material such as aluminum, and the sidewall of the cap has attached thereto a rim 44 of low conductivity material, such as titanium. In FIG. 5, the high heat conductive portion 36a is rimmed with a low heat conductive ceramic piece 46. In both the caps of FIG. 4 and FIG. 5, the rim member is provided with a rounded shoulder 48 adapted to mate with the curvature of the neck 18 where it attaches to the tube. The ceramic rim 46 is also shaped to partially conform to the upper surface of the centrifuge tube. Whereas the position of the cap, illustrated in FIGS. 3*a–e*, must be controlled by the operator or by separate locating means to prevent accidental forcing of it onto the top portion 16 of the tube, or even accidental sideways displacement of the neck as it melts, the caps of FIGS. 4 and 5, with low conductivity rims, provide guidance and final location of the cap on the unfused portion of the tube neck.

Figure 6B:
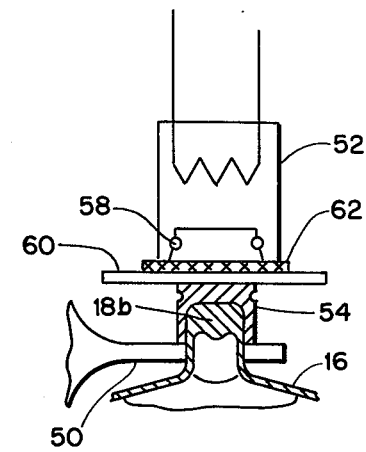
Figure 6C:
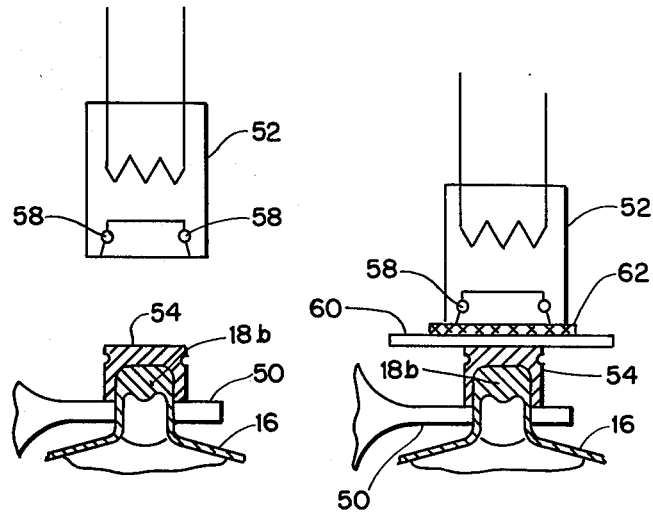

Referring now to FIGS. 6*a–c*, there is shown an alternative method and apparatus for sealing the neck of a substantially closed centrifuge tube. This method is appropriately used when the neck protrudes from a thin walled tube, likely to be somewhat flexible and of insufficient rigidity to resist the force of the cap and/or pressure inducing means without excessive displacement of the tube neck in a downward or sideways direction. Such displacement is likely to cause the tube contents, in turn, to be displaced upward into the tube neck either damaging the contents or creating steam which tends to hamper the sealing of the tube. In this method, the tube neck 18 is held in a clamping means or member and supported in the upward direction. The clamping member 50 is precisely located with respect to a heating means or plunger 52 which, in this embodiment, carries the high thermal conductive cap within a releasable grip or clamp such as a wire retainer clamp 58. Wire retainer clamp 58 extends through holes in the plunger 52 and after the cap 54 is heated and pressed onto the end portion of the neck 18, the wire clamp is removed releasing the cap 54 as the plunger 52 is retracted. When heat and pressure are applied to the cap 54, the neck melts and is forced inwardly by the sidewalls of the cavity of the cap to form a molten mass 18*b* closing the filler passage 20. As in the prior method, the pressure and heat are removed by retraction of the plunger as shown in FIG. 6*b*. Following this step, a cooling means or heat sink may be moved into contact with the cap 54 in order to expedite the heat removal from the cap and the molten mass 18*b*. As shown in FIG. 6*c*, a copper chilling strip 60 is squeezed against the cap 54 by the plunger 52. The chilling strip includes a thermal insulating layer 62 which prevents the hot plunger from again heating the cap 54. In this embodiment, the cap 54 is made flat on top in order to increase the heat transfer surface in contact respectively with the heating rod or plunger 52 and, later, the copper cooling strip 62. After a few seconds contact with the cap 54, the cooling strip 60 is removed and the cap is lifted from the completely sealed and formed tube neck 18.

Figure 7:
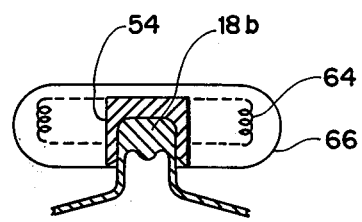
FIG. 7 is a schematic view illustrating another method and apparatus for heating the heat conductive cap member.

Other means may be employed to heat the sealing cap. For example, as shown in FIG. 7, a suitable infrared heater 64 could be focused on the cap by a mirror 66 to produce heat capable of melting the neck of the tube. In such a case the cap 54 could be made of greater mass to provide sufficient pressure on the stem causing it to fold as desired during the fusion step. It might be desirable to blacken the outer surface of the cap so as to increase its ability to absorb heat. One could also substitute radio frequency or induction heating to raise the temperature of the cap above the fusion temperature of the tube neck.

In general, the tube neck 18 is made small in diameter consistent with the requirements for filling with gradient solution and sample within a reasonable time. However, it is conceivable that, for special purposes, a large diameter or very thin wall neck will provide insufficient material for proper seal forming. Under such circumstances, a small tapered or shouldered plug of fusible plastic can be placed in the tube neck before placing the cap thereover. When a suitable forming cap is heated and then chilled on the neck, the plug will melt along with the sidewall of the neck to produce a very strong seal or closure across the filler passage.

While in accordance with the patent statutes there has been shown and described what at present are believed to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. A method for closing a filler passage formed in a neck protruding from the opening in the end of a substantially closed centrifuge tube, the neck being formed of a heat fusible material, comprising:
   supporting said centrifuge tube in an upright position with said filler neck protruding upwardly;
   placing a heat conductive cap over the open end portion of said neck, said cap having an inner cavity closely confining the outer surface of the end portion of said neck therein;
   applying heat to said heat conductive cap sufficient to melt the confined end portion of said neck;
   applying pressure to said cap moving said cap in a direction along the longitudinal axis of said neck thereby causing progressive portions of said neck to melt and fold inwardly into the filler passage therein;
   removing said heat and pressure from said cap so that said cap cools and the melted material in said filler passage of said neck solidifies therein completely closing said filler passage; and
   removing said cap from said neck.

2. The method defined in claim 1 wherein said cap is heated by means of a heating element which supplies heat to said cap and also applies pressure on said cap in a direction along the axis of said neck.

3. The method defined in claim 1 in which said cap has an inwardly slanting wall surface forcing said melting portion of said neck to fold inwardly as pressure is applied to said cap in a direction along the longitudinal axis of said neck.

4. The method defined in claim 1 in which said cap has a hemispherical shaped inner cavity surface forcing said melting portions of said neck to fold inwardly.

5. The method defined in claim 1 in which heat is applied by means not engaging said cap and the pressure applied in a direction along the longitudinal axis of said neck comprises the weight of the cap.

6. The method defined in claim 1 in which heat is applied to said cap prior to its placement over the open end portion of said neck and pressure and heat are then applied until the end portions of said neck melt wherein said heat and pressure are removed from said cap.

7. The method defined in claim 1 including the step of applying external cooling means in contact with said heat conductive cap after said heat and pressure are removed in order to quickly cool said cap and solidify the melted material in said filler passage.

8. A method for closing a filler neck protruding from the opening in the end of a substantially closed centrifuge tube, the filler neck being formed of a heat fusible plastic material and having a filler passage along the axis of said neck for delivery of liquid into the centrifuge tube, comprising:

supporting said centrifuge tube in an upright position with said filler neck protruding upwardly;

placing a heat conductive cap over the open end portion of said neck, said cap having an inner cavity closely confining the outer surface of the end portion of said neck therein;

applying heat to said heat conductive cap sufficient to melt the plastic material forming the confined end portion of said neck;

applying pressure to said cap moving said cap in a direction along the longitudinal axis of said neck thereby causing progressive portions of said neck to melt and fold inwardly to form a mass of plastic material in said filler passage;

supporting said neck at some position above the centrifuge tube while said heat and pressure are applied to said neck above such position in order to maintain said neck oriented in an upward direction;

removing said heat and pressure from said cap so that said cap cools and said mass of melted plastic material in said filler passage solidified therein completely closing said filler passage; and removing said cap from said neck.

9. A method for closing a filler neck protruding from the opening in the end of a substantially closed centrifuge tube, the neck being formed of a heat fusible plastic material and having a filler passage along the axis of said neck for delivery of liquid into the centrifuge tube, comprising:

supporting said centrifuge tube in an upright position;

applying a clamping means to support said filler neck at a predetermined position above said centrifuge tube thereby maintaining said neck in a substantially upright position;

placing a heat conductive cap over the open end portion of said neck, said cap having an inner cavity closely confining the outer surface of the end position of said neck therein;

applying heat to said heat conductive cap sufficient to melt the confined end portion of said neck;

applying pressure to said cap moving said cap in a direction along the longitudinal axis of said neck thereby causing progressive portions of said neck to melt and fold inwardly to form a mass of plastic material closing said filler passage, said pressure forcing said cap along said neck until lower portions thereof abut against said clamping means;

removing said heat and pressure from said cap so that said cap cools and said mass of plastic material in said filler passage solidifies to close said filler passage; and removing said cap and said clamping means from said neck.

10. The method defined in claim 9 including the additional step of applying external cooling means to said cap after said heat and pressure are removed in order to quickly cool said cap and solidify the mass of melted plastic closing said filler passage.

11. Apparatus for closing a passage formed in a filler neck protruding from the opening in the end of a substantially closed centrifuge tube after said tube has been filled with sample, the neck being formed of a heat fusible material, comprising:

means adapted to engage the outer surface of said centrifuge tube for supporting said centrifuge tube in an upright position with said filler neck protruding upwardly;

a cap formed of a high heat conductivity material having a cavity adapted to closely fit the circumference of said filler neck, said cap adapted to be positioned over the end portion of said filler neck to confine said end portion of said neck within said cavity;

means for applying heat to said cap member for raising the temperature thereof to the fusion temperature of said material forming said neck;

pressure applying means movable upwardly and downwardly in a direction subsantially along the axis of said filler passage, said pressure applying means adapted to apply pressure downwardly against said cap so that, when said cap is heated to the fusion temperature of said neck, progressive portions of said neck melt and said cap is forced downwardly so that the sidewalls of said filler neck fold inwardly into said filler passage and form a molten mass closing said filler passage;

clamping means adapted to grasp said neck at some predetermined position above the upper end of said centrifuge tube to maintain said neck in a substantially upright position as pressure and heat are applied to said cap; and means for retracting said pressure applying means and interrupting said heat applying means thereby permitting said cap to cool and said molten mass to solidify within the filler passage of said neck of said centrifuge tube.

12. The apparatus of claim 11 in which said pressure applying means is also a heating element for supplying both pressure and heat to said heat conductive cap.

13. The apparatus defined in claim 11 in which said cap is formed of aluminum.

14. The apparatus defined in claim 11 in which said cap comprises a central section defining a hemispherical shaped cavity and includes a cylindrical sidewall to encompass the outer circumference of said neck and support said cap on said filler neck without external supporting means.

15. The apparatus defined in claim 14 in which said cap further includes a rim of low heat conductive material attached to the bottom portion of the cylindrical sidewall thereby providing a heat insulating means between the centrifuge tube and the heat conductive portions of said cap.

16. The apparatus defined in claim 15 in which said low heat conductive rim is formed of titanium or ceramic material and includes a lower surface and shoulder conforming to the upper surface of said centrifuge tube at its connecting point with said neck.

17. Apparatus for closing a passage formed in a filler neck protruding from the opening in the end of a substantially closed centrifuge tube after said tube has been filled with sample, the neck being formed of a heat fusible material, comprising:

means adapted to engage the outer surface of said centrifuge tube for supporting said centrifuge tube in an upright position with said filler neck protruding upwardly;

a cap formed of high heat conductivity material having a cavity adapted to closely fit the circumference of said filler neck, said cap adapted to be positioned over the end portion of said filler neck to confine said end portion of said neck within said cavity;

means for applying heat to said cap member for raising the temperature thereof to the fusion temperature of said material forming said neck;

pressure applying means movable upwardly and downwardly in a direction substantially along the axis of said filler passage said pressure applying means adapted to apply pressure downwardly against said cap so that, when said cap is heated to the fusion temperature of said neck, progressive portions of said neck melt and as said cap is forced downwardly the side-walls of said filler neck fold inwardly into said filler passage and form a molten mass closing said filler passage, clamping means adapted to grasp said neck at some predetermined position above the upper end of said centrifuge tube to maintain said neck in a substantially upright position as pressure and heat are applied to said cap;

means for retracting said pressure applying means and interrupting said heat applying means from said cap; and cooling means movable into contact with said cap for rapidly cooling said cap and permitting said molten mass to solidify thereby closing the filler passage in said neck of said centrifuge tube.

18. The apparatus defined in claim 17 in which said cooling means comprises a strip of copper or other high thermal conductivity material placed into contact with the upper portion of said cap to provide a heat sink for rapidly conducting heat from the cap.

19. The apparatus of claim 12 in which there is provided on said heating element a cap retainer for supporting said cap on said heating element for heating said cap prior to its engagement with the end portion of said neck and including means for releasing said cap when said heating element is withdrawn.

* * * * *